United States Patent
Risbeck et al.

(10) Patent No.: US 6,500,269 B2
(45) Date of Patent: Dec. 31, 2002

(54) METHOD OF CLEANING TURBINE COMPONENT USING LASER SHOCK PEENING

(75) Inventors: James D. Risbeck, Cincinnati, OH (US); Thomas E. Anderson, Mason, OH (US); Stephen J. Ferrigno, Cincinnati, OH (US); Tris Colaizzi, Morrow, OH (US)

(73) Assignee: General Electric Company, Schnectady, NY (US)

( * ) Notice: Subject to any disclaimer, the term of this patent is extended or adjusted under 35 U.S.C. 154(b) by 171 days.

(21) Appl. No.: 09/771,850

(22) Filed: Jan. 29, 2001

(65) Prior Publication Data

US 2002/0100492 A1 Aug. 1, 2002

(51) Int. Cl.⁷ .............................. B08B 3/12; B08B 5/02; B08B 9/00; B08B 9/027; B08B 6/00
(52) U.S. Cl. ........................ 134/1; 134/22.1; 134/22.11; 134/22.12; 134/22.18; 134/26; 134/30
(58) Field of Search ........................ 134/1, 22.1, 22.11, 134/22.12, 22.18, 26, 30

(56) References Cited

U.S. PATENT DOCUMENTS

| | | | |
|---|---|---|---|
| 4,439,241 A | 3/1984 | Ault et al. ............... 134/22.17 |
| 4,937,421 A | 6/1990 | Ortiz et al. ............. 219/121.68 |
| 5,151,134 A | * 9/1992 | Boquillon et al. .............. 134/1 |
| 5,464,479 A | 11/1995 | Kenton et al. .................. 134/1 |
| 5,507,306 A | 4/1996 | Irvine et al. ................. 134/166 |
| 5,575,858 A | 11/1996 | Chen et al. ...................... 134/3 |
| 5,618,353 A | 4/1997 | Irvine et al. ............. 134/22.17 |
| 5,674,328 A | 10/1997 | Mannava et al. ........... 148/525 |
| 5,674,329 A | 10/1997 | Mannava et al. ........... 148/525 |
| 5,679,174 A | 10/1997 | Buongiorno ............. 134/22.18 |
| 5,707,453 A | 1/1998 | Shurman et al. ................ 134/1 |
| 5,744,781 A | 4/1998 | Yeaton .................. 219/121.84 |
| 5,911,891 A | 6/1999 | Dulaney et al. ........ 219/121.85 |
| 5,932,120 A | 8/1999 | Mannava et al. ...... 219/121.85 |
| 5,938,855 A | 8/1999 | Bowden ........................ 134/1 |

* cited by examiner

Primary Examiner—Zeinab El-Arini
(74) Attorney, Agent, or Firm—V. G. Ramaswomy; Haase Guttag & Nesbitt LLC; Eric W. Guttag

(57) ABSTRACT

A method of cleaning airfoils and related turbine engine components that have a crust-like debris deposited on the surface thereof. This method involves subjecting at least the portion of the component having the deposit of the crust-like debris to sufficient laser shock peening to cause the debris on the surface thereof to be loosened therefrom so that the loosened debris can be removed from the component. This loosened debris can then be removed from the component, such as by passing a cleaning fluid through the portion of the component that is subjected to the laser shock peening.

20 Claims, No Drawings

METHOD OF CLEANING TURBINE COMPONENT USING LASER SHOCK PEENING

BACKGROUND OF THE INVENTION

The present invention relates generally to a method of cleaning turbine engine components using laser shock peening. The present invention particularly relates to the use of laser shock peening to remove a crust-like debris that buildups on the surface of the internal cooling cavity of an airfoil such as a turbine blade or vane.

A typical gas turbine engine includes a compressor, a combustor, and a turbine. Both the compressor and the turbine include alternating rows of rotating and stationary airfoils in the form of turbine blades or vanes. Air flows axially through the engine, with the compressed gases emerging from the compressor being mixed with fuel in the combustor and burned therein. The hot products of combustion, emerging from the combustor at high pressure, enter the turbine where the hot gases produce thrust to propel the engine and to drive the turbine which in turn drives the compressor.

Gas turbine engines operate in an extremely harsh environment characterized by vibrations and very high temperatures. The airfoils in the turbine are at risk of burning because of the hot gases emerging from the combustor. Various cooling schemes exist to provide adequate cooling to these turbine airfoils. Many of these cooling schemes include intricate internal passages, such as a serpentine passage, that vent cooling air therethrough. The cooling schemes can also include tiny cooling holes formed within the wall structure of the airfoil to allow the cooling air to pass therethrough. See U.S. Pat. No. 5,575,858 (Chen et al), issued Nov. 19, 1996, and in particular FIG. 2, which shows one such airfoil 30 with elaborate internal cooling passages referred to as 38–40.

The air that circulates through the airfoils, particularly during operation on the ground, includes particles of sand, dust, dirt and other contaminants that can be ingested by the engine. The sand, dust, dirt, etc., aided by extremely high temperatures and pressures, can adhere to the surface of the internal cavity of the airfoils and can form a compacted layer or layers of a crust or coating (hereinafter referred to as "crust-like") of this debris that can reduce the size or block entirely the air holes and the internal passages within the airfoil, thereby reducing the efficiency of the cooling thereof. See U.S. Pat. No. 5,575,858 (Chen et al), issued Nov. 19, 1996. Due to the centrifugal forces at operation in the airfoil during rotation of the compressor and turbine, this crust-like debris especially tends to collect and buildup on the surface of the internal cooling cavities at the tip of the airfoil.

If the accumulation of this crust-like debris on the surface of the internal cooling cavities of the airfoil becomes sufficiently great to block cooling airflow, the metal temperature of the airfoil can greatly increase, leading to premature distress and limiting usability of the airfoil. In particular, external coatings on the airfoil, if heated to a sufficiently high temperature, can oxidize through to the base metal, making the airfoil unserviceable. In addition and if not removed, this crust-like debris can begin to react with the base metal during some high temperature airfoil repair processes, leading to intergranular attack (i.e., corrosion at the grain boundaries of the base metal) on the internal wall of the airfoil. If severe enough, this can produce cracks that go completely through the wall of the airfoil.

To ensure that these internal cavities are passable for the cooling air, the airfoils need to be cleaned periodically during their lifetime to remove this crust-like debris deposited on the surface of these cavities or else be replaced. Since the airfoils are manufactured from relatively expensive materials so as to withstand high temperatures, vibrations and cycling, frequent replacement of all or some of the airfoils can be very costly. Therefore, a method for cleaning these airfoils would be a preferred alternative to replacement. Furthermore, since each engine typically includes hundreds of such airfoils, any reduction in time in cleaning each airfoil could potentially result in tremendous time savings and subsequently lead to significant cost savings.

This crust-like debris can be deposited on either the external or internal surfaces of the airfoil. However, because the buildup of this deposited crust-like debris tends to occur especially in the internal cooling cavities of the airfoil, removal of this debris can be a problem, especially since access to these cavities with conventional cleaning tools or methods is often extremely difficult or even impossible. One prior method for cleaning and removing crust-like debris deposited on the surface of these internal cavities is by exposure to an alkaline or caustic solution, such as a potassium hydroxide solution, under pressure (150–350 psi) and at relatively high temperatures (150–235° C.) for relatively long periods of time (e.g., upwards of 20 hours or more). This is then followed by water blasting under pressure to flush out the softened debris. See U.S. Pat. No. 4,439,241 (Ault et al), issued Mar. 27, 1984. See also U.S. Pat. No. 5,507,306 (Irvine et al), issued Apr. 16, 1996 (manifold clamped to the root of the airfoil components, with heated caustic solution being pumped through the manifold and into the internal cavities of the airfoils); and U.S. Pat. No. 5,575,858 (Chen et al), issued Nov. 19, 1996 (after treating with caustic solution, airfoils are soaked in a chelating agent solution such as the tetrasodium salt of ethylenedarine tetracetic acid (EDTA)). A significant disadvantage in using caustic solutions is the typically long time period required for treatment to ensure that the deposited debris is adequately softened or loosened in the internal cavity of the airfoil. Even after a long period of treatment with the caustic solution, the softening or loosening of the deposited debris can be less than desired, especially when the deposited debris layer is thick or the internal cavity is relatively complicated or intricate in design. Also, the residual caustic solution can remain entrained within the internal cavity, even after high-pressure water flushing, thus potentially causing undesired corrosion of the surface (or any coating thereon) of the internal cavity over time.

Another prior method for cleaning and removing deposited debris from these internal cavities is by immersing the airfoils in water so that the deposited debris becomes saturated therewith, followed by immersion in a cryogenic fluid, such as liquid nitrogen, to cause the residual water in the internal cavities to freeze and cause loosening of the debris, and then pressure flushing with additional water to remove the loosened or dislodged debris. This sequence of water saturation, freezing and high pressure flushing can be repeated to ensure adequate removal of the debris from the internal cavities of the airfoils. See U.S. Pat. No. 5,464,479 (Kenton et al), issued Nov. 7, 1995. A significant disadvantage of this method is that it can potentially subject the airfoils to successive freeze-thaw cycles that can cause cracking and other undesired stresses to be imparted to the airfoil.

Another prior method for cleaning and removing this deposited crust-like debris from these internal cavities involves immersing the airfoils in a tank of cleaning solution, such as a mild alkaline solution, and then immersing an ultrasonic agitator, such as a welding horn, in this tank. The ultrasonic waves that are generated by the welding horn are focused on the portion of the airfoil having the deposited crust-like debris layer, followed by pressure flushing of the airfoil with water to remove the loosened or dislodged debris. See U.S. Pat. No. 5,707,453 (Shurman et al), issued Jan. 13, 1998. See also U.S. Pat. No. 5,938,855 (Bowden), issued Aug. 17, 1999 (ultrasonic agitation of turbine component soaked in a solution of acetic acid.) A disadvantage with this ultrasonic cleaning method is that it is not completely effective in loosening or dislodging the crust-like debris from the surface of the internal cavity of the airfoil for removal by pressure flushing with water. Also, and potentially more significantly, this ultrasonic cleaning method can potentially induce cracks and other undesired stresses into the airfoil unless it is carefully controlled.

Another prior method for cleaning and removing this deposited crust-like debris from these internal cavities is to drill a hole into the airfoil proximate where the deposited debris has collected or built up, insert a cleaning tube through the drilled hole and into the internal cavity, and then pass a cleaning material such as heated water under pressure through the cleaning tube and into the cavity to dislodge the deposited debris and remove it from the cavity. See U.S. Pat. No. 5,679,174 (Buongiorno), issued Oct. 21, 1997. A significant disadvantage of this prior cleaning method is that it is invasive of the airfoil in that the drilled hole for the cleaning tube needs to be repaired or sealed (such as by laser plug welding) after the cleaning step is concluded.

Accordingly, it would desirable, therefore, to provide a method for effectively and efficiently cleaning airfoils and other turbine engine components to remove this collected and deposited crust-like debris that can build up on the exterior surfaces and especially the internal cavity surfaces of the component without the need of potentially corrosive cleaning solutions and without the need of invasive operations that can require subsequent repair of the component.

SUMMARY OF THE INVENTION

The present invention relates to a method of cleaning airfoils and related turbine engine components that have a crust-like debris deposited on the surface thereof. This method comprises the step of subjecting at least the portion of the component having the deposit of the crust-like debris to sufficient laser shock peening to cause the debris on the surface thereof to be loosened therefrom so that the loosened debris can be removed from the component. This loosened debris can then be removed from the component, such as by passing a cleaning fluid (e.g., high pressure air, water or aqueous cleaning solution) through the portion of the component that is subjected to the laser shock peening.

The cleaning method of the present invention provides a number of significant advantages and benefits over prior methods of cleaning airfoils and related turbine engine components to remove this crust-like debris. In particular, the laser shock wave that is imparted by laser shock peening induces stresses and strains in the component that loosens the crust-like debris adhering to the surface of the component so that it can be more easily removed without the need of more corrosive cleaning solutions. The method of the present is particularly useful in removing such crust-like debris from the internal cavities of airfoils without the need of invasive methods that require repair after the cleaning is concluded. In particular, it has been found that laser shock peening is effective in imparting shock waves to the component that can reach the internal cavities of the airfoil and thus loosen and dislodge debris that has collected and built up on the surface of the cavity, including the portion of the cavity at the tip of the airfoil where the build up of this crust-like debris can be particularly thick and difficult to loosen and dislodge.

DETAILED DESCRIPTION OF THE INVENTION

The method of the present invention is useful in cleaning a variety of turbine engine components, including but not limited to, airfoils such as gas turbine engine blades or vanes, where a crust-like debris has been formed and deposited on the surface of the component. This crust-like debris is typically the result of ingestion by the engine of particles of sand, dust, dirt and other contaminants present in the air or gas flow. This crust-like debris can then progressively and over time become deposited as a series of compacted layers on the surface of the component.

These crust-like layers of debris can be present on external surface, as well as the internal surface, of various turbine engine components. Even so, the method of the present invention is suitable in removing these crust-like layers of debris whether they are on an external surface of the component or an internal surface of the component. However, the method of the present invention is particularly useful in removing these crust-like layers of debris from the internal surfaces of such components where the effective removal of such crust-like layers of debris can be especially difficult to achieve without causing other undesired effects such as potential corrosion of the component or the surface thereof, damage to any coating (e.g., protective coating) on the surface of the component, or using an invasive treatment that can require subsequent repair of the component after cleaning is achieved.

The method of the present invention is particularly suitable in removing these crust-like layers of debris when they become deposited on the surface of the internal cooling cavities of an airfoil. These airfoils with internal cooling cavities include those disclosed and shown in, for example, U.S. Pat. No. 5,464,479 (Kenton et al), issued Nov. 7, 1995; U.S. Pat. No. 5,507,306 (Irvine et al), issued Apr. 16, 1996; U.S. Pat. No. 5,575,858 (Chen et al), issued Nov. 19, 1996; U.S. Pat. No. 5,679,174 (Buongiorno), issued Oct. 21, 1997; U.S. Pat. No. 5,707,453 (Shurman et al), issued Jan. 13, 1998, all which are incorporated by reference. In particular, the method of the present invention is particularly useful in loosening and dislodging any crust-like layers of debris that form in the internal cavities proximate the tip of the airfoil due to this debris tending to collect and build up at the tip because of the centrifugal forces created during the rotation of the compressor and turbine.

The presence and extent of this crust-like debris, as well as the sufficiency of removal this debris by the method of the present invention as described hereafter, can be determined by conventional X-ray analysis techniques. See U.S. Pat. No. 5,464,479 (Kenton et al), issued Nov. 7, 1995 (herein incorporated by reference) which describes one such X-ray analysis technique. Preferably, the component, such as an airfoil, suspected of having this crust-like debris, is filled with a metallic powder such as tungsten carbide powder that can be removed later after the analysis has been completed. The filled component is then subjected to X-ray radiography with the subsequent radiographic images that are recorded being inspected to determine the presence and extent of the debris. (If tungsten carbide powder is used, the crust-like debris shows up as the darker image, i.e., is a reverse negative, relative to the lighter tungsten carbide powder.) This analysis can be carried out each time after the component has been treated by the method of the present invention to determine whether the crust-like debris has been removed sufficiently from the component.

The method of the present invention comprises the step of subjecting at least the portion of the component having the deposit of the crust-like debris to sufficient laser shock peening to cause the debris on the surface thereof to be loosened therefrom so that the loosened debris can be removed from the component. As used herein, the term "laser shock peening" or LSP typically refers to multiple radiation pulses from high power pulsed lasers that impact to produce shock waves on the surface of a work piece, the shock waves produced then propagating into and through the work piece. See, for example, LSP methods disclosed in U.S. Pat. No. 5,674,329 (Mannava et al), issued Oct. 7, 1997 and U.S. Pat. No. 5,932,120 (Mannava et al), issued Aug. 3, 1999, both of which are incorporated by reference. Laser peening as understood in the art and as used herein, means utilizing a laser beam from a laser beam source to produce a strong localized compressive force on a portion of a surface by instantaneous ablation or vaporization of a painted surface, coated surface (such as by using tape) or an uncoated surface. Laser peening has been utilized to create a compressively stressed protection layer at the outer surface of a workpiece which is known to considerably increase the resistance of the workpiece to fatigue failure as disclosed in U.S. Pat. No. 4,937,421 (Ortiz et al), issued Jun. 26, 1990. However, LSP has not been previously disclosed for use in methods of cleaning turbine engine components and in particular in cleaning the internal cavities of airfoils such as turbine blades and vanes.

At least some of these LSP methods typically employ a curtain of water flowed over the workpiece. The curtain of water provides a confining medium, to confine and redirect the process generated shock waves into the bulk of the material of a component being subjected to LSP, to create the beneficial compressive residual stresses. This confining medium also serves as a carrier to remove process generated debris. Water is an ideal confining medium since it is transparent to the ND:YAG beam wavelength generated in LSP and is easy to implement in production.

The traveling compressive shock waves generated by LSP have been found to be beneficial in the method of the present invention in loosening and dislodging the crust-like debris that is deposited on the surface of the internal cavities of turbine engine components such as airfoils. In particular, the waves generated by LSP can cause deep plastic compressive strains to be imparted throughout the component. As these compressive shock waves reach the surfaces of the internal cavities of the component, the resulting strains cause the crust-like debris that has been collected or deposited thereon to be loosened and dislodged from the surface thereof. In addition, these shock waves can also be transferred to the collected or deposited crust-like debris itself to promote further disruption and loosening of the debris from the surface of the internal cavity. As a result, this loosed and dislodged debris can be more easily removed from the internal cavity of the component by fairly gentle methods of removal, such as flushing or rinsing the internal cavity with a gaseous fluid (e.g., high pressure air), water or other relatively mild cleaning fluids such as an aqueous surfactant-containing solution. Moreover, while the method of the present invention is particularly useful in loosening and dislodging the crust-like debris that has collected and deposited on internal surfaces, such as the surface of the internal cavities of an airfoil that can be difficult to access by other cleaning methods, it is also extremely effective in loosening and dislodging such debris that has been collected and deposited on the external surface of the airfoil or other turbine engine component. In addition, it has been found that lower pulse energy LSP waves can be used to cause effective loosening and dislodging the debris, and thus avoid potential for distorting the metallic structure of the component if higher pulse energy LSP waves were used.

The shock wave created by LSP can be imparted to the turbine engine component that requires cleaning at any location thereof that will ensure that the shock wave reaches the affected portion of the component having the deposit of crust-like debris on the surface thereof. For example, in the case of airfoils that require cleaning of the internal cavities, the LSP shock wave can be imparted either through the side of the airfoil or radially through the tip thereof. For airfoils having tip shrouds, the LSP shock wave can be imparted radially through the shroud to cause loosening and dislodging of the crust-like debris deposited on the surface of the internal cavities.

The method of the present can use either high energy (e.g., from about [20] to about 50 joules/pulse) or low energy (e.g., from about 3 to about 10 joules/pulse) lasers to generate the LSP shock wave. See, for example, U.S. Pat. No. 5,674,329 (Mannava et al), issued Oct. 7, 1997 (LSP process using high energy laser pulses) and U.S. Pat. No. 5,932,120 (Mannava et al), issued Aug. 3, 1999 (LSP process using low energy laser pulses), both of which are incorporated by reference. The particular energy pulse that is used is usually dependent on the size or diameter of the laser beam spot that impacts the component. See FIG. 4 of U.S. Pat. No. 5,674,329 and U.S. Pat. No. 5,932,120, which show such laser beam spots 58 having diameters D. For higher energy pulses, it is preferable to increase the laser spot beam diameter to minimize or eliminate deformation of the surface of the component that is impacted. Conversely, for lower energy pulses, it is preferable to decrease the size of the laser beam spot to ensure that the LSP shock wave that is generated has sufficient impact to cause loosening of the crust-like debris from the surface of the component. Usually, the combination of the energy of the pulse and the size of the laser beam spot should provide an energy density up to about 200 joules/cm$^2$ (at higher energy densities, there can be excessive deformation of the surface of the component), with a range of from about 50 to about 200 joules/cm$^2$, preferably from about 75 to about 150 joules/cm$^2$, providing a sufficient LSP shock wave to cause effective loosening and/or dislodging of the crust-like debris from the surface of the component subjected to LSP. In terms of the diameter of the laser beam spot, this usually translates to spot diameters in the range of from about 0.04 to about 0.3 inches (from about 1 to about 7.6 mm), with a typical range of from about 0.04 to about 0.12 inches (from about 1 to about 3 mm) for lower energy pulses and from about 0.25 to about 0.3 inches (from about 6.3 to about 7.6 mm) for higher energy pulses.

Another parameter that can be important for effective LSP treatment by the method of the present invention is spot spacing, i.e., the distance from the center of one laser beam spot to the center of the adjacent laser beam spot. This is usually measured in terms of the degree to which the adjacent laser beam spots overlap. See FIGS. 4 and 5 of U.S. Pat. Nos. 5,674,329 and U.S. Pat. No. 5,932,120 and accompanying text. Usually, adjacent laser beam spots should overlap by at least about 30%. Typically, the degree of overlap between adjacent laser beam spots is in the range of from about 30 to about 50%.

Another parameter that can be important for effective LSP treatment by the method of the present invention is the number of patterned layers of LSP pulses applied to the surface of the component, the number of layers determining how often the pulse strikes the same area. See FIGS. 4 and 5 of U.S. Pat. Nos. 5,674,329 and U.S. Pat. No. 5,932,120 and accompanying text. In the method of the present invention, from 1 to 4 pulse layers are usually applied to the surface of the component. These layers or patterns of LSP pulses are also usually applied the surface of the component in a particular sequence. A typical sequence involves a series of pulses applied to the surface of the component that do not overlap each other, followed by a series of pulses applied to the surface of the component to fill in the gaps between the pulses of the original series so that the laser beam spots of the completed pattern or layer do overlap.

Other parameters that can be important for effective LSP treatment by the method of the present invention are pulse length (also referred to as "pulse duration" or "pulse width") and laser rise time, both of which are usually measured in nanoseconds. For them method of the present invention, the pulse length is usually at least about 10 nanoseconds, with the rise time being about 10 nanoseconds or less. Typically, the pulse length is in the range of from about 10 to about 40 nanoseconds with a rise time of from about 3 to about 10 nanoseconds, and preferably about 20 30 nanoseconds, with a rise time of about 6 nanoseconds.

After the turbine engine component has been subjected to LSP to loosen and dislodge the deposited crust-like debris, this loosened and dislodged debris is desirably and preferably removed from the component. For debris that has been loosened and dislodged from the external surface of the component, this removal step can be fairly straightforward, such as wiping off the debris, flushing the debris off with a cleaning fluid such as water or an aqueous solution containing a surfactant, or other suitable manner for removing external debris that has been loosened or dislodged.

In the case of crust-like debris that has been loosened and dislodged from the internal surface of the component, such as the internal cavities of an airfoil, this removal step can be somewhat more complicated because of the difficulty in accessing the loosened and dislodged debris and of ensuring that all or most of the loosened and dislodge debris has been removed from the internal structure of the component. Suitable methods for removing internally loosened and dislodged debris include flushing or rinsing with one or more of a gaseous fluid such as high pressure air or nitrogen (e.g., at least about 40 psi, and typically in the range of from about 40 to about 120 psi), with water or an aqueous cleaning solution, typically introduced under pressure (e.g., at least about 500 psi, and typically in the range of from about 3500 to about 1000 psi), or other suitable manner for removing internal debris that has been loosened or dislodged. Suitable cleaning solutions include aqueous surfactant solutions, aqueous solutions of organic or inorganic bases such as sodium or potassium hydroxide, aqueous solutions of a scale removing agent, preferably a mildly acidic scale removing agent containing glycolic acid, citric acid, acetic acid, water-soluble salts thereof (e.g., sodium and/or potassium salts), and mixtures thereof such as Turco Scale Gon #5, aqueous solutions of a chelating agent such as EDTA (e.g., Versene). See U.S. Pat. No. 4,439,241 (Ault et al), issued Mar. 27, 1984 (use of potassium hydroxide cleaning solutions); U.S. Pat. No. 5,507,306 (Irvine et al), issued Apr. 16, 1996 (use of sodium and potassium hydroxide cleaning solutions); U.S. Pat. No. 5,575,858 (Chen et al), issued Nov. 19, 1996 (use of chelating agent solutions); U.S. Pat. No. 5,938,855 (Bowden), issued Aug. 17, 1999 (use of solution of acetic acid), all of which are incorporated by reference. When flushing or rinsing with gaseous fluids, as well as water or aqueous cleaning solution, the components is typically flushed with the gaseous fluid initially, followed by flushing or rinsing with water or aqueous cleaning solution.

Suitable aqueous surfactant cleaning solutions for use herein include those containing nonionic surfactants such as polyethyleneoxide condensates of alkyl phenols, for example, nonyl phenol condensed with about 9.5 moles of ethylene oxide per mole of nonyl phenol, dodecylphenol condensed with about 12 moles of ethylene oxide per mole of phenol, dinonyl phenol condensed with about 15 moles of ethylene oxide per mole of phenol; and di sooctyl phenol condensed with about 15 moles of ethylene oxide per mole of phenol and commercially available under the trade names Igepal CO-630 (marketed by the OAF Corporation), and Triton X-45, X-114, X-100, and X-102 (all marketed by the Rohm & Haas Company); condensation products of aliphatic alcohols with ethylene oxide, for example, the condensation product of myristyl alcohol with about 10 moles of ethylene oxide per mole of alcohol; and the condensation product of about 9 moles of ethylene oxide with coconut alcohol (a mixture of fatty alcohols with alkyl chains varying in length from 10 to 14 carbon atoms) and commercially available under the trade names Tergitol 15-S-9 (marketed by Union Carbide Corporation), Neodol 45-9, Neodol 23-6.5, Neodol 45-7, and Neodol 45-4 (marketed by Shell Chemical Company), and Kyro EOB (marketed by The Proctor & Gamble Company); condensation products of ethylene oxide with a hydrophobic base formed by the condensation of propylene oxide with propylene glycol and commercially available under the trade name Pluronic (marketed by Wyandotte Chemical Corporation); condensation products of ethylene oxide with the product resulting from the reaction of propylene oxide and ethylenediamine and commercially available under the trade name Tetronic (marketed by Wyandotte Chemical Corporation); anionic surfactants such as alkali metal soaps (e.g., the sodium, potassium, ammonium and alkylolammonium salts of higher fatty acids containing from about 8 to about 24 carbon atoms, preferably from about 10 to about 20 carbon atoms); water-soluble salts, preferably the alkali metal, ammonium and alkylolammonium salts, of organic sulfuric reaction products, for example, sodium and potassium alkyl sulfates, especially those obtained by sulfating the higher alcohols (e.g., 8 to 18 carbon atoms), the sodium and potassium alkylbenzene sulfonates (preferably the alkyl polyethoxylate sulfates), sodium alkyl glyceryl ether sulfonates, sodium coconut oil fatty acid monoglyceride sulfonates and sulfates; sodium or potassium salts of alkyl phenol ethylene oxide ether sulfates; sodium or potassium salts of alkyl ethylene oxide ether sulfates; water-soluble salts of esters of alpha-sulfonated fatty acid; water-soluble salts of olefin sulfonates; beta-alkyloxy alkane sulfonates, as well as mixtures of nonionic and anionic surfactants.

Flushing or rinsing of the loosened or dislodged debris can also be assisted by using ultrasonic treatment where the component is immersed in water or the aqueous cleaning solution. See U.S. Pat. No. 5,707,453 (Shurman et al) (use of ultrasonic immersion), issued Jan. 13, 1998; U.S. Pat. No. 5,938,855 (Bowden), issued Aug. 17, 1999, both of which are incorporated by reference. Indeed, once the crust-like debris has been loosened or dislodged by LSP, removal using ultrasonic immersion or by flushing or rinsing with various cleaning solutions can be significantly easier and less time consuming to carry out.

While specific embodiments of the present invention have been described, it will be apparent to those skilled in the art that various modifications thereto can be made without departing from the spirit and scope of the present invention as defined in the appended claims.

What is claimed is:

1. A method of cleaning gas turbine engine components having a crust-like debris deposited on a surface thereof, the method comprising the step of: (a) subjecting at least a portion of the component having the deposit of the crustlike debris to sufficient laser shock peening to cause the deposited debris on the surface thereof to be loosened therefrom so that the loosened debris can be removed from the component.

2. The method of claim 1 wherein step (a) comprises subjecting the portion of the component to laser beam pulses providing an energy density of from about 50 to about 200 joules/cm$^2$ when impacting the portion of the component.

3. The method of claim 2 wherein step (a) comprises subjecting the portion of the component to laser beam pulses providing an energy density in the range of from about 75 to about 150 joules/cm$^2$.

4. The method of claim 2 wherein the laser beam, on impacting the portion of the component, provides a laser spot beam having a diameter of from about 0.04 to about 0.3 inches (from about 1 to about 7.6 mm).

5. The method of claim 4 wherein the laser beam has an energy of from about 20 to about 50 joules/pulse and wherein the diameter of the laser beam spot is in the range of from about 0.25 to about 0.3 inches (from about 6.3 to about 7.6 mm).

6. The method of claim 4 wherein the laser beam has an energy of from about 3 to about 10 joules/pulse and wherein the diameter of the laser beam spot is in the range of from about 0.04 to about 0.12 inches (from about 1 to about 3 mm).

7. The method of claim 4 wherein the laser beam pulses provide adjacent laser beam spots that overlap by at least about 30%.

8. The method of claim 7 wherein the adjacent laser beam spots overlap from about 30 to about 50%.

9. The method of claim 4 wherein the laser beam pulses are applied to the portion of the component in a patterned layer of laser beam spots.

10. The method of claim 9 wherein from 1 to 4 patterned layers are applied.

11. The method of claim 2 wherein the laser beam pulses have a pulse length of at least about 10 nanoseconds and a laser rise time of about 10 nanoseconds or less.

12. The method of claim 2 wherein the laser beam pulses have a pulse length of from about 10 to about 40 nanoseconds and a laser rise time of from about 3 to about 10 nanoseconds.

13. The method of claim 1 which comprises the further step of flushing the component with gaseous fluid to remove the loosened crust-like debris.

14. The method of claim 1 which comprises the further step of flushing or rinsing the component with water or an aqueous cleaning solution to remove the loosened crust-like debris.

15. A method for cleaning an airfoil having internal cavities and having a crustlike debris deposited on a surface of the internal cavities proximate a tip of the airfoil, the method comprising the step of: (a) subjecting the tip of the air foil to laser beam pulses providing an energy density of from about 50 to about 200 joules/cm$^2$ when impacting the tip of the airfoil to cause the deposited debris on the surface of the internal cavities of the airfoil to be loosened therefrom so that the loosened debris can be removed.

16. The method of claim 15 wherein the laser beam, on impacting a portion of the airfoil, provides a laser beam spot having a diameter of from about 0.04 to about 0.3 inches (from about 1 to about 7.6 mm).

17. The method of claim 16 having adjacent laser beam spots that overlap by from about 30 to about 50%.

18. The method of claim 17 wherein the laser beam pulses are applied to the portion of the airfoil in a patterned layer of laser beam spots, and wherein from 1 to 4 patterned layers are applied.

19. The method of claim 15 wherein the laser beam pulses have a pulse length of from about 10 to about 40 nanoseconds and a laser rise time of from about 3 to about 10 nanoseconds.

20. The method of claim 15 which comprises the further step of flushing or rinsing the internal cavities of the airfoil with one or more of a gaseous fluid, water or an aqueous cleaning solution to remove the loosened crust-like debris.

\* \* \* \* \*

UNITED STATES PATENT AND TRADEMARK OFFICE
CERTIFICATE OF CORRECTION

PATENT NO.    : 6,500,269 B2
DATED         : December 31, 2002
INVENTOR(S)   : James D. Risbeck et al.

It is certified that error appears in the above-identified patent and that said Letters Patent is hereby corrected as shown below:

<u>Title page,</u>
Item [74], *Attorney, Agent, or Firm*, "Ramaswomy; Haase" should be deleted and -- Ramaswamy; Hasse -- should be inserted.

<u>Column 2,</u>
Line 25, delete the extra space between "250º" and "C"; and delete the period after "C".
Line 37, insert the word -- ethylenedamine -- and delete the word "ethylenedarine".

<u>Column 4,</u>
Line 22, before the word "external", insert the word -- the --.
Line 47, delete the extra space between "U.S." and "Pat."
Line 56, after the word "removal", insert the word -- of --.

<u>Column 6,</u>
Line 24, after the word "present", insert the word -- invention --.
Line 65, delete the word "Nos." and insert the word -- No. --.

<u>Column 7,</u>
Line 8, before the patent number "5,674,329" delete the word "Nos." and insert the word -- No. --.
Line 23, after the word "For", delete the word "them" and insert the word -- the --.
Line 54, delete the number "1000" and insert the number -- 10000 --.

<u>Column 8,</u>
Line 17, after the word "and", delete the words "di sooctly" and insert the word -- diisooctyl --.
Line 20, delete the word "OAF" and insert the word -- GAF --.

UNITED STATES PATENT AND TRADEMARK OFFICE
CERTIFICATE OF CORRECTION

PATENT NO.    : 6,500,269 B2
DATED         : December 31, 2002
INVENTOR(S)   : James D. Risbeck et al.

It is certified that error appears in the above-identified patent and that said Letters Patent is hereby corrected as shown below:

<u>Column 9,</u>
Line 13, delete the word "crustlike" and insert the word -- crust-like --.

Signed and Sealed this

Thirteenth Day of May, 2003

JAMES E. ROGAN
*Director of the United States Patent and Trademark Office*